United States Patent
Broda

(10) Patent No.: US 6,261,698 B1
(45) Date of Patent: Jul. 17, 2001

(54) BREATHABLE FILM FOR CHEESE PACKAGING

(75) Inventor: Michelle Elizabeth Broda, Greer, SC (US)

(73) Assignee: Cryovac Inc., Duncan, SC (US)

( * ) Notice: Subject to any disclaimer, the term of this patent is extended or adjusted under 35 U.S.C. 154(b) by 0 days.

(21) Appl. No.: 09/434,044

(22) Filed: Nov. 4, 1999

(51) Int. Cl.⁷ .................. B32B 27/08; B32B 27/34
(52) U.S. Cl. .................. 428/474.4; 423/475.5; 423/475.8; 423/476.3
(58) Field of Search ............... 428/474.4, 475.5, 428/475.8, 476.3

(56) References Cited

U.S. PATENT DOCUMENTS

| | | | |
|---|---|---|---|
| 4,909,726 | * 3/1990 | Bekele | 428/34.3 |
| 4,963,426 | 10/1990 | Nishimoto et al. | 428/213 |
| 5,084,310 | 1/1992 | Hisazumi et al. | 428/34.8 |
| 5,126,401 | 6/1992 | Chou | 525/58 |
| 5,232,767 | 8/1993 | Hisazumi et al. | 428/213 |
| 5,270,390 | 12/1993 | Shibuya et al. | 525/173 |
| 5,336,549 | 8/1994 | Nishimoto et al | 428/213 |
| 5,344,476 | * 9/1994 | Vicik | 428/36.91 |
| 5,344,679 | 9/1994 | Vicik | 525/432 |
| 5,491,009 | 2/1996 | Bekele | 428/35.7 |
| 5,763,095 | * 6/1998 | Ramesh | 428/477.4 |
| 5,866,214 | 2/1999 | Ramesh | 428/34.8 |
| 6,063,417 | * 5/2000 | Paleari | 426/127 |

* cited by examiner

Primary Examiner—Leszek Kiliman
(74) Attorney, Agent, or Firm—Mark B. Quatt

(57) ABSTRACT

The present invention is directed to a heat shrinkable film for packaging high gassing cheeses, specifically Swiss-type cheeses. The film includes at least one barrier layer of a copolyamide having a melting temperature of less than about 150° C., preferably nylon 6/6.9, and exhibits a $CO_2:O_2$ transmission ratio of at least 7.0 at 50% relative humidity. Furthermore, the film has a hot tensile strength at 85° C. of at least 1800 psi in at least one direction as measured by D882 and a percent elongation at 85° C. of at least 120% in at least one direction as measured by ASTM D882. Preferably, at least 50 percent by weight of the film is one or more ethylene copolymers, preferably one or more ethylene/vinyl acetate copolymers.

9 Claims, No Drawings

BREATHABLE FILM FOR CHEESE PACKAGING

FIELD OF THE INVENTION

This invention relates to packaging films, and more particularly to a multilayer film having a combination of relatively low oxygen transmission, and relatively high carbon dioxide transmission.

BACKGROUND OF THE INVENTION

Thermoplastic film, and in particular polyolefin materials, have been used for some time in connection with packaging of various articles including food products which require protection from the environment, an attractive appearance, and resistance to abuse during the storage and distribution cycle. Suitable optical properties are also desirable in order to provide for inspection of the packaged product after packaging, in the distribution chain, and ultimately at point of sale. Optical properties such as high gloss, high clarity, and low haze characteristics contribute to an aesthetically attractive packaging material and packaged product to enhance the consumer appeal of the product. Various polymeric materials have been used to provide lower gas permeability in order to reduce the transmission of oxygen through the packaging film and thereby retard the spoilage and extend the shelf life of products such as food items which are sensitive to oxygen.

Some cheese products are produced in such a way that the final cheese product emits a significant amount of carbon dioxide over time. In such cases, it is often desirable to provide a packaging material which is characterized by a relatively low oxygen transmission rate (i.e. good oxygen barrier), and a relatively high carbon dioxide transmission rate. A preferred $O_2$ transmission rate is no more than about 500 cc/m²-day-atmosphere (ASTM D 3985 at 73° F.), more preferably no more than about 250 cc/m²-day-atmosphere, and even more preferably no more than about 175 cc/m²-day-atmosphere. A preferred $CO_2$ transmission rate is at least about 750 cc/m²-day-atmosphere at 730° F., more preferably at least about 1000 cc/m²-day-atmosphere, most preferably at least about 1200 cc/m²-day-atmosphere. $CO_2$ transmission is measured using an analytical technique analogous to ASTM D 3985. The ratio of $CO_2$ transmission rate to $O_2$ transmission rate is preferably greater than about 5:1, and most preferably at least about 7:1.

It is also often desirable to include in a packaging film a shrink feature, i.e., the propensity of the film upon exposure to heat to shrink or, if restrained, create shrink tension within the packaging film. This property is imparted to the film by orientation of the film during its manufacture. Typically, the manufactured film is heated to an orientation temperature and then stretched either in a longitudinal (machine) direction, a transverse direction, or both, in varying degrees to impart a certain degree of shrinkability in the film upon subsequent heating. After being so stretched, the film is rapidly cooled to provide this latent shrinkability to the resulting film. One advantage of shrinkable film is the tight, smooth appearance of the wrapped product that results, providing an aesthetic package as well as protecting the packaged product from environmental abuse. Various food and non-food items may be and have been packaged in shrinkable films.

For certain products the shrink force of the shrinkable film must be controlled in order to avoid deformation. Furthermore, for irregularly shaped products a heat shrinkable film must be able to draw into crevices without imploding. Thus, a sufficiently high tensile strength and percent elongation at or about the shrink temperature are required. Such properties are especially important for Swiss cheese packaging.

SUMMARY OF THE INVENTION

The present invention is directed to a heat shrinkable multilayer film which includes a barrier layer of a copolyamide having a melting temperature of less than about 150° C., preferably less than about 140° C., wherein the film has a hot tensile strength at 850°C. of at least 1800 psi in at least one direction as measured by ASTM D882 and a percent elongation at 85° C. of at least 120% in at least one direction as measured by ASTM D882, and wherein the film exhibits a $CO_2:O_2$ transmission ratio of at least 7.0 at 50% relative humidity. Most preferably the copolyamide is nylon 6/6.9.

Preferably the film includes, in its various layers, at least 50 percent by weight of an ethylene copolymer, preferably ethylene/vinyl acetate.

The copolyamide of the barrier layer may be present, either alone or in a blend with another polymer such as, for example, another polyamide.

The present invention is also directed to a package which includes a product, preferably Swiss cheese which has a plurality of holes, and a film enclosing and immediately adjacent to the block of Swiss cheese, the film extending downwardly into the holes of the Swiss cheese. The films of the package includes a barrier layer of a copolyamide having a melting temperature of less than about 150° C. and a $CO_2:O_2$ transmission ratio of at least 7.0 at 50% relative humidity.

DEFINITIONS

As used herein, the term "comonomer" refers to a monomer which is copolymerized with at least one different monomer in a copolymerization reaction, the result of which is a copolymer.

As used herein, the term "copolymer" refers to polymers formed by the polymerization reaction of at least two different monomers. Thus, "copolymer" as used herein can mean terpolymer. The term "terpolymer" refers herein specifically to the copolymerization reaction product of three monomers.

As used herein, the phrase "ethylene alpha-olefin copolymer", and "ethylene/a-olefin copolymer", refer to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/a-olefin copolymers, such as the long chain branched homogeneous ethylene/a-olefin copolymers available from the Dow Chemical Company, known as AFFINITY (TM) resins, are also included as another type of ethylene alpha-olefin copolymer useful in the present invention.

As used herein, the term "polyamide" refers to polymers having amide linkages along the molecular chain, and preferably to synthetic polyamides such as nylons. Furthermore, such term encompasses both polymers comprising repeating units derived from monomers, such as caprolactam, which polymerize to form a polyamide, as well as copolymers of two or more amide monomers, including nylon terpolymers, also referred to generally as "copolyamides" herein.

As used herein, the term "ethylene/vinyl acetate copolymer" or "EVA" refers to ethylene copolymerization with vinyl acetate comonomer.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "aromatic comonomer" refers to a portion or moiety of a polyamide which comprises, consists essentially of, or consists of an aromatic material. Thus, the comonomer of a nylon copolymer which contains the aromatic material can be entirely made up of the aromatic material, or can include additional non-aromatic constituents. For example, in a 66/610/6I terpolymer, the aromatic comonomer is 6I.

DETAILED DESCRIPTION OF PREFERRED EMBODIMENTS

The present invention relates to a film material which can be used to package products which are sensitive to oxygen but which also emit carbon dioxide for some period of time during packaging. The present film material is preferably a multilayer film in which one of the layers is formed from a nylon copolymer having a melting temperature of less than about 150° C. More preferably, the barrier layer of the present film is formed from a nylon copolymer having a melting temperature of less than about 140° C. Most preferably, the present barrier layer is formed of nylon 6/6.9.

Looking to the specific end use application, it is common in the packaging of high gassing cheeses to package the cheese product in a polymeric film, cure the cheese at a relatively high humidity of typically between 40 and 85% RH, more typically 50 to 70% RH, and then store the cheese, prior to purchase by the consumer, for months at a relatively low humidity of typically between 60 to 0% RH. Prior art films such as those set forth in the comparative example below, and especially those which contain a layer of a vinylidene chloride copolymer as a barrier layer, are relatively insensitive to changing relative humidity. Films made in accordance with the present invention, however, have the advantage of carbon dioxide transmission rates and $CO_2:O_2$ transmission ratios which are sensitive to changing relative humidity and which adjust in a manner which is especially advantageous for use in the conventional processing of high gassing cheeses. That is, during cure at high relative humidities the film materials of the present invention exhibit exceptionally high carbon dioxide transmission rates, preferably at least about 1000 $cc/m^2$-day-atmosphere, more preferably at least about 1200 $cc/m^2$-day-atmosphere. The oxygen transmission rate also increases at high relative humidities but not enough to adversely affect the product. One can cure the cheese product at high relative humidities during curing followed by storage at low relative humidity (when oxygen barrier is more critical). During storage low oxygen transmission rates retard mold growth on the stored cheese.

Films of the present invention have a $CO_2:O_2$ transmission ratio greater than 5.0 and most preferably greater than 6.0. Especially preferred are ratios greater than 7.0, 8.0, and 9.0. It has been found that the preferred nylon copolymers of the present invention exhibit an increased $CO_2:O_2$ transmission ratio upon orientation. For example, BM 13 SBG, a nylon 6/6.9 supplied by EMS has a $CO_2:O_2$ transmission ratio of 2.8 prior to orientation and demonstrates ratios in the range of 8.0 to 13.0 following orientation.

If desired, the nylon copolymer used in the film of the present invention may be blended with another resin. For example, the nylon copolymer may be blended with another oxygen barrier resin such as ethylene vinyl alcohol copolymer (EVOH) in order to achieve a desired set of properties. Because EVOH loses much of its oxygen barrier properties with increasing relative humidity, the overall $CO_2:O_2$ transmission ratio during cure would not be greatly affected; but, the oxygen barrier during storage, when oxygen barrier properties become important, would be increased. That is, the addition of at least a minor portion of EVOH to a nylon copolymer-containing layer of the film of the present invention would serve to lower the oxygen transmission rate of the total film structure at low relative humidities.

Optionally, the nylon copolymer of the present inventive film may be blended with or positioned directly adjacent to a hydrophilic material such as, for example, a polyether polyamide block copolymer. Such a material absorbs, at standard temperature and pressure, and at 100% RH, at least 2% by weight of the material of water, preferably at least 5%, more preferably 10%, even more preferably at least 15%, most preferably at least 20%, especially at least 25%. The presence of at least a minor amount of such a hydrophilic material could serve to attract moisture to the nylon copolymer and therefore, increase the $CO_2:O_2$ transmission ratio. The presence of a moisture attracting material, either mixed in with or immediately adjacent to the nylon copolymer of the present invention appears to allow the nylon copolymer to experience a higher relative humidity environment than if it were not present. Other examples of suitable hydrophilic materials are polyvinyl alcohol, and polyethylene oxide.

Similarly, the nylon copolymer of the film material of the present invention may be blended with other polymeric materials in order to achieve or optimize one or more desired film properties. For example, the copolyamide of the present barrier layer can be blended with another nylon which can be, for example, a partially aromatic nylon, or a conventional nylon such as nylon 6,66.

In the case of blends, the blend can range from 1–99% of the copolyamide of the present invention and 99–1% of the second material, more preferably 25–75% of the copolyamide of the present invention and 75% to 25% of the second material.

The film of the present invention may have any desired number of layers. Preferably, the various layers of the film are coextruded. However, lamination, extrusion coating and other techniques can also be employed in forming the multilayer film of the present invention. The nylon copolymer employed in the inventive film may be present either in an outer layer or an inner layer of the film. If desired, the film may contain more than one nylon copolymer-containing layer. If present as an exterior layer the nylon copolymer-containing layer may serve as a sealant layer or an abuse layer.

The multilayer film structure is preferably oriented. Orientation is most preferably performed by a blown bubble technique either out of hot water, hot air, or infrared heating, although other orientation techniques such as, for example, tenter framing, may alternatively be employed. A film made from the present invention when oriented will have a free shrink at 185° F. of between 5 and 70%, and preferably 10 to 60%, more preferably 15 to 50%, even more preferably 20 to 40%, in either or both of the LD (longitudinal direction) or TD (transverse direction).

Orientation ratios are preferably between 2:1 and 7:1, more preferably between 3:1 and 5:1 in either or both of the LD (longitudinal direction) or TD (transverse direction).

The film of the present invention is optionally partially or completely crosslinked, preferably by electron beam irradiation, and most preferably prior to orientation although irradiation following orientation is also within the scope of the present invention. In the irradiation process, the film is subjected to an energetic radiation treatment, such as X-ray, gamma ray, beta ray, and high energy electron treatment, which induce cross-linking between molecules of the irradiated material. A preferred radiation dosage of high energy electrons is between 20 and 200 kGy (kilograys), more preferably between 25 and 150 kGy, most preferably between 50 and 100 kGy. Preferably, irradiation is carried out by an electron accelerator and the dosage level is determined by standard dosimetry methods.

Other structural layers which may be included in the multilayer film of the present invention include seal, core, abuse, and tie (adhesive) layers.

In addition to the nylon copolymer of the present invention or other polyamides, preferred resins for use in the seal layer of the present film include polyolefins. Specific materials which can be employed include polyolefins such as ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid. The seal layer is preferably between 0.05 and 5, more preferably between 0.3 and 2, and most preferably between 0.4 and 0.8 mils thick.

In addition to the nylon copolymer of the present invention or other polyamides, preferred resins for use in the barrier layer of the present film include polyolefins. Specific resins which may be employed include ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid, most preferably, an ionomer. Preferred resins are those which have a melting point less than 140° C. and a crystallinity less than 60%; more preferably, those which have a melting point less than 120° C. and a crystallinity less than 40%. The barrier layer is preferably between 0.1 and 5, more preferably between 0.2 and 2, and most preferably between 0.4 and 1 mils thick.

In addition to the nylon copolymer of the present invention or other polyamides, preferred resins for use in the abuse layer of the present film include polyolefins. Specific resins which may be employed include ethylene, propylene and butene homopolymers and copolymers, both heterogeneously and homogeneously catalyzed. Especially preferred are copolymers of ethylene and a comonomer such as an alpha-olefin, a vinyl acetate, an acrylate, or an acrylic acid. Preferred resins are those which have a melting point greater than 80° C. and less than 140° C. and a crystallinity less than 60%; more preferably, those which have a melting point greater than 90° C. and less than 130° C. and a crystallinity less than 40%. The abuse layer is preferably between 0.1 and 5, more preferably between 0.2 and 2, even more preferably between 0.3 and 1, and most preferably between 0.4 and 0.7 mils thick.

Resins for use in tie layers of the present inventive film include modified polyamides and modified polyolefins such as anhydride grafted polyolefins. The preferred tie layer composition will depend on the composition of the core, sealant or abuse layer to which a nylon copolymer-containing layer is being adhered. Each tie layer is preferably between 0.05 and 0.5, more preferably between 0.1 and 0.3 mils thick.

The total thickness of films made in accordance with the invention is preferably between 0.1 and 20 mils, more preferably between 0.3 and 10 mils, even more preferably between 0.5 and 5 mils, and most preferably between 1 and 3 mils. The film layer comprising the nylon copolymer of the present invention preferably forms between 2 and 40%, more preferably between 5 and 30%, even more preferably between 8 and 20% of the total film thickness.

Preferred film structures employing the nylon of the present invention are:
Seal/Nylon/Seal
Seal/Tie/Nylon/Tie/Seal
Seal/Nylon as Abuse
Seal/Core/Nylon as Abuse
Seal/Nylon/Abuse
Seal/Core/Nylon/Abuse
Nylon as Seal/Core/Abuse
Seal/Core/Nylon/tie/Abuse
Seal/Core//Nylon/tie/Abuse
Seal/Core//Nylon/Abuse
Seal/Core//Tie/Nylon/Tie/Abuse
Seal/Core/Tie//Nylon/Tie/Abuse
wherein double slashes (//) indicate extrusion coating of the layers on the right onto the layers on the left and wherein tie layers may be employed throughout as is appropriate.

Preferably, the layer or layers containing the copolyamide of the present invention serves as the only barrier of the film. In less preferred embodiments, one or more further barrier layers comprising conventional barrier resins such as polyvinylidene chloride, ethylene vinyl alcohol or other polyamides may be present.

Generally, the preferred end-use for the multilayer film of the present invention is the packaging of Swiss-type cheeses, which include various types of Swiss cheese as well as other eyed cheeses. Thus, the copolyamide barrier layer of the present film provides the required carbon dioxide and oxygen transmission rates. However, shrink packaging of Swiss cheese also requires that the film employed be capable of drawing into the holes of the cheese during the heat shrinking step without imploding. In accordance with the present invention it has been found that tensile strength at 85° C. and percent elongation at 85° C. are excellent indicators of a film's ability to form to Swiss cheese holes without breaking during the heat shrinking step, which is performed at about 85° C. The present inventive film having a tensile strength at 85° C. of at least 1800 psi in at least one direction as measured by ASTM D882 and a percent elongation at 85° C. of at least 120% in at least one direction as measured by ASTM D882. Preferably, these properties are achieved by providing a film which has at least about 50 percent by weight of one or ethylene copolymers wherein the comonomer is selected from the group consisting of acrylate, vinyl acetate, and acrylic acid. More preferably, the properties are achieved by providing a film which has at least 50 percent by weight of one or more ethylene/vinyl acetate copolymers.

The following examples are representative of preferred embodiments of the multilayer film of the present invention. The following resins were used in the production of films in accordance with the present invention:

EO: Affinity PL 1280, a branched, homogeneous ethylene octene copolymer having a density of 0.900 g/cc supplied by the Dow Chemical Co., Midland, Mich.;

EH: Escorene LL 3003.32, a heterogeneous ethylene hexene copolymer having a density of 0.918 g/cc supplied by Exxon;

EVA1: Escorene LD-720.92, an ethylene vinyl acetate copolymer having a vinyl acetate content of 19.3% by weight, supplied by Exxon;

tie: Tymor 1203, an anhydride grafted linear low density polyethylene adhesive resin supplied by Morton International;

Ny: Grilon BM 13 SBG, a nylon 6/6.9 having a melting point of 134° C. supplied by EMS;

EVA2: Escorene LD-318.92, an ethylene vinyl acetate copolymer having a vinyl acetate content of 9% by weight, supplied by Exxon;

HDPE: Fortiflex T60-500-119, a high density polyethylene supplied by Solvay;

AP: Grivory G21, an amorphous nylon having a melting temperature of 125° C., supplied by EMS; and IO: Surlyn AM7927, an ionomer, specifically a zinc-neutralized salt of methacrylic acid having a melting point of 94° C., a density of 0.98 g/cc density, and a melt index of 16, supplied by DuPont.

EXAMPLES 1–6

A variety of seven layer film structures were formed by an extrusion coating process. A three layer substrate was coextruded and the remaining four layers were extrusion coated onto the substrate in a single step. These structures are shown with the heat sealing layer on the left and the abuse layer on the right. The films of Examples 1 and 2 were formed initially as a 23.8 mil tape. Those of Examples 3 and 4 were formed as a 26.5 mil tape and those of Examples 5 and 6 were formed as a 23.5 mil tape. All were then oriented to a final target gauge of 2.00 mils. The percent relative thicknesses of the individual layers are given below each structure.

| | Layer 1 | Layer 2 | Layer 3 | Layer 4 | Layer 5 | Layer 6 | Layer 7 |
|---|---|---|---|---|---|---|---|
| Ex. 1 | 80%EO 20%EH | EVA1 | EVA1 | Tie | Ny | Tie | EVA2 |
| | 23.1% | 18.9% | 19.3% | 4.2% | 9.2% | 3.4% | 21.8% |
| Ex. 2 | 80%EO 20%EH | EVA1 | EVA1 | Tie | 60%Ny 20%AP 20%IO | Tie | EVA2 |
| | 23.1% | 18.9% | 19.3% | 4.2% | 9.2% | 3.4% | 21.8% |
| Ex. 3 | 80%EO 20%EH | EVA1 | EVA1 | Ny | EVA1 | EVA1 | 90% EVA2 10% HDPE |
| | 15.1% | 37.7% | 11.3% | 5.7% | 7.5% | 15.1% | 7.5% |
| Ex. 4 | 80%EO 20%EH | EVA2 | EVA1 | Ny | EVA1 | EVA1 | 90% EVA2 10% HDPE |
| | 15.1% | 37.7% | 11.3% | 5.7% | 7.5% | 15.1% | 7.5% |
| Ex. 5 | 80%EO 20%EH | EVA1 | EVA1 | Ny | EVA1 | EVA1 | EVA2 |
| | 17.0% | 34.0% | 12.8% | 6.4% | 8.5% | 12.8% | 8.5% |
| Ex. 6 | 80%EO 20%EH | EVA2 | EVA1 | Ny | EVA1 | EVA1 | 90% EVA2 10% HDPE |
| | 17.0% | 34.0% | 12.8% | 6.4% | 8.5% | 12.8% | 8.5% |

EXAMPLES 7–10

A variety of eight layer films were produced in accordance with the present invention by a conventional coextrusion method followed by orientation to a target gauge of 2.00 mils. The films of Examples 7 and 8 were coextruded initially as a 16.5 mil tape. Those of Examples 9 and 10 were coextruded initially as a 19.5 mil tape.

| | Layer 1 | Layer 2 | Layer 3 | Layer 4 | Layer 5 | Layer 6 | Layer 7 | Layer 8 |
|---|---|---|---|---|---|---|---|---|
| Ex. 7 | 80% EO 20% EH | EVA1 | Tie | Ny | Tie | EVA1 | EVA1 | 90% EVA2 10% HDPE |
| | 24.2% | 24.2% | 6.1% | 9.1% | 6.1% | 12.1% | 12.1% | 6.1% |
| Ex. 8 | 80% EO 20% EH | EVA1 | Ny | EVA1 | Ny | EVA1 | EVA1 | 90% EVA2 10% HDPE |
| | 24.2% | 24.2% | 4.2% | 12.1% | 4.8% | 12.1% | 12.1% | 6.1% |
| Ex. 9 | 80% EO 20% EH | EVA1 | Tie | Ny | Tie | EVA1 | EVA1 | 90% EVA2 10% HDPE |
| | 20.5% | 20.5% | 5.1% | 7.7% | 5.1% | 20.5% | 10.2% | 10.2% |

-continued

| | | | | | | | | |
|---|---|---|---|---|---|---|---|---|
| Ex. 10 | 80% EO 20% EH | EVA1 | Ny | EVA1 | Ny | EVA1 | EVA1 | 90% EVA2 10% HDPE |
| | 20.5% | 20.5% | 3.6% | 10.2% | 4.1% | 20.5% | 10.2% | 0.2% |

COMPARATIVE EXAMPLE 11

For comparative purposes a multilayer film having a vinylidene chloride copolymer barrier layer and sold as B180 by Cryovac, Inc., a subsidiary of Sealed Air Corp., Saddlebrook, N.J., was analyzed.

The films of Example Nos. 1–4, 7, 8, and 10 and Comparative Example No. 11 were tested for tensile strength at 85° C., percent elongation at 85° C., $CO_2:O_2$ transmission ratio at 50% relative humidity, lubricated puncture at 85° C. and at 90.6° C., and haze and gloss in order to determine fitness for use in Swiss cheese packaging. The following tests were employed:

Tensile Strength and Percent Elongation were measured by ASTM D882 whereby a thin plastic film sample was uniaxially deformed by the application of a tensile stress.

Oxgen Transmission was measured by ASTM D3985 whereby one side of a film sample was exposed to oxygen under controlled conditions and the steady-state transmission rate was measured on the opposite side of the film.

Carbon Dioxide Transmission was measured using an analytical technique analogous to ASTM D3985.

Gloss was measured by ASTM D2457-90 whereby a glossmeter was employed with the incident beam at a 45 degree angle to the specimen.

Haze was measured by ASTM D1003-95 whereby a hazemeter was employed.

Lubricated Puncture was measured on an Instron machine using a test initially developed for testing the formability of vacuum skin packaging films wherein a tup attached to the Instron crosshead punctures a sample of the film while moving at a strain rate of 60 inches/minute at each of 85° C. and 90.6° C. in order to simulate the environment in which the film shrinks into the Swiss-type cheese holes. A polyethylene powder to sprinkled onto the film to act as a lubricant, thereby providing for a uniform biaxial extension.

The results for tensile strength (expressed in psi), percent elongation and $CO_2:O_2$ transmission ratio are set forth in Table I, below.

TABLE I

Tensile, Elongation and Transmission Properties

| Film of Ex. No. | Tensile Strength-85° C. | | % Elongation - 85° C. | | $CO_2:O_2$ at 50% RH |
|---|---|---|---|---|---|
| | Long. | Transv. | Long. | Transv. | |
| 1 | 1802 ± 74 | 2289 ± 316 | 128 ± 70 | 235 ± 4 | 8.88 |
| 2 | 2069 ± 80 | 1890 ± 131 | 150 ± 5 | 160 ± 14 | 9.36 |
| 3 | 1869 ± 278 | 1537 ± 209 | 146 ± 35 | 101 ± 12 | 12.0 |
| 4 | 2064 ± 132 (2227 ± 107)* | 2328 ± 317 (1962 ± 294)* | 173 ± 17 (120 ± 11)* | 165 ± 13 (129 ± 8)* | 13.0 |
| 7 | 2245 ± 537 | 2455 ± 540 | 304 ± 8 | 225 ± 42 | 8.8 |
| 8 | 2015 ± 220 | 2587 ± 138 | 209 ± 64 | 196 ± 8 | 13.0 |
| 10 | 1950 ± 165 | 3124 ± 434 | 164 ± 32 | 234 ± 22 | 11.5 |
| 11 | 1670 ± 55 | 1096 ± 155 | 81 ± 6 | 168 ± 7 | 8.6 |

*A second production run of the film of Example 4 yielded slightly different tensile and elongation properties, as is shown above.

The results for haze and gloss are set forth in Table II, below.

TABLE II

Optical Properties

| Film of Ex. No. | Haze | Gloss |
|---|---|---|
| 1 | 6.2 ± 1.3 | 67 ± 5 |
| 2 | 3.9 ± 7 | 82 ± 6 |
| 3 | 8.9 ± 0.3 | 60 ± 2 |
| 4 | 6.0 ± 0.5 (3.5%*) | 72 ± 1 (83%*) |
| 7 | 7.9 ± 1.5 | 69 ± 5 |
| 8 | 6.8 ± 0.6 | 64 ± 3 |
| 10 | 6.4 ± 1.0 | 73 ± 1 |
| 11 | 7.8 ± 1.1 | 73 ± 6 |

*A second production run of the film of Example 4 yielded significantly improved optical properties, as is shown above.

The results for the lubricated puncture test for the films of Example 4 and Comparative Example 11 are set forth in Table III, below.

TABLE III

Lubricated Puncture

| Film of Example No. | Toughness at 85° C. | Toughness at 90.6° C. |
|---|---|---|
| 4 | 965 psi | 930 psi |
| 11 | 531 psi | 410 psi |

The foregoing description of preferred embodiments of the invention has been presented for illustration, and is not intended to be exhaustive. Modifications are possible in light of the above teachings or may be acquired from practice of the invention.

What is claimed is:

1. A heat shrinkable multilayer film comprising:

a barrier layer comprising a copolyamide having a melting temperature of less than about 150° C.;

wherein said film has a hot tensile strength at 85° C. of at least 1800 psi in at least one direction, and a percent elongation at 85° C. of at least 120% in at least one direction; and wherein said film exhibits a $CO_2$:$CO_2$ transmission ratio of at least 7.0 at 50% relative humidity.

2. The film set forth in claim 1 wherein said barrier layer comprises a copolyamide having a melting temperature of less than about 140° C.

3. The film set forth in claim 1 wherein said barrier layer comprises nylon 6/6.9.

4. The film set forth in claim 1 wherein said film comprises at least 50 percent by weight of a copolymer of ethylene and at least one further monomer selected from the group consisting of acrylate, vinyl acetate, and acrylic acid.

5. The film set forth in claim 4 wherein said film comprises at least 50 percent by weight of ethylene/vinyl acetate copolymer.

6. The film set forth in claim 1 wherein said barrier layer consists essentially of a copolyamide having a melting temperature of less than about 150° C.

7. The film set forth in claim 1 wherein said barrier layer further comprises a further copolyamide.

8. The film set forth in claim 7 wherein said further copolyamide comprises an amorphous copolyamide.

9. The film set forth in claim 1 wherein said barrier layer further comprises less than 50 percent by weight of a polyolefin.

* * * * *